(No Model.)
C. L. GODDARD.
TOOTHED CYLINDER FOR BURRING MACHINES.
No. 314,664. Patented Mar. 31, 1885.
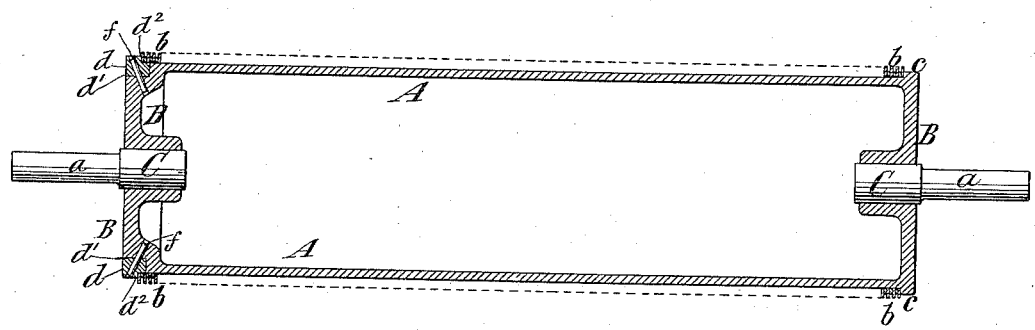
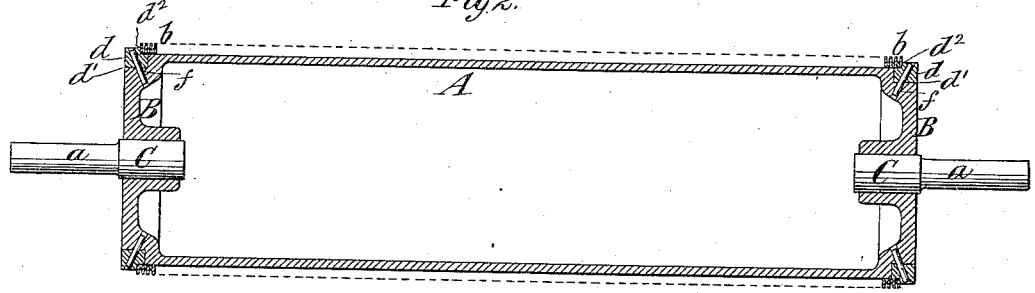
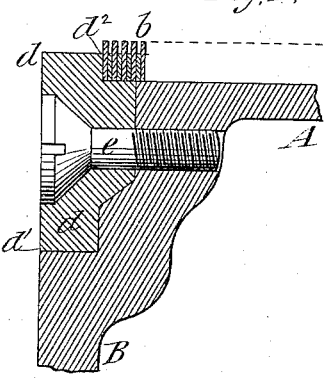
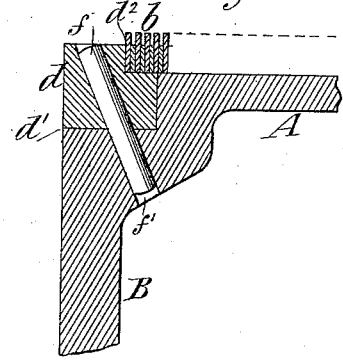
Witnesses:
C. Hall
Matthew Pollock
Inventor:
Calvin L. Goddard
by his Atty
Brown & Brown

UNITED STATES PATENT OFFICE.

CALVIN L. GODDARD, OF NEW YORK, N. Y.

TOOTHED CYLINDER FOR BURRING-MACHINES.

SPECIFICATION forming part of Letters Patent No. 314,664, dated March 31, 1885.

Application filed December 1, 1882. (No model.)

*To all whom it may concern:*

Be it known that I, CALVIN L. GODDARD, of the city and county of New York, in the State of New York, have invented a new and useful Improvement in Toothed Cylinders for Burring-Machines and other Purposes, of which the following is a specification.

My invention relates to cylinders for burring-machines, having toothed surfaces, composed of toothed rings made separate from and independent of each other, and interposed packing-rings, the rings being slipped upon the cylinder-body and secured thereon by being clamped between flanges which project beyond the circumference of the body at the ends thereof, and one or both of which is removable to enable the rings to be placed on and removed from the cylinder.

The objects of my invention are to so construct the removable flange at the end of the cylinder, and so combine the toothed rings therewith that the said rings will aid in preventing the said flange from springing away from the end of the cylinder, and also to provide a simple and desirable means, hereinafter described, for securing said removable flange in place on the cylinder.

The invention consists in the combination of a cylindric body having integral ends, and having in one end an annular rabbet, short shafts or gudgeons inserted in said integral ends, and toothed rings and interposed packing-rings, made separate from and independent of each other, and fitting on said body, and a removable flange secured in the rabbeted end of the cylinder, and itself rabbeted on its inner side, so as to form a continuation of the periphery of the body and a seat for the end rings.

The invention also consists in the combination of a hollow cylindric body having the ends closed and integral with the body, short shafts or gudgeons secured in said integral ends, toothed rings and interposed packing-rings made separate from and independent of each other and fitting upon said body, a flange applied to the end of said body to secure the rings thereon, and securing devices for said flanges inserted from the outer edge or circumference of the flange in a direction transverse to the axis of the cylinder and entering the integral end of the cylinder.

In the accompanying drawings, Figures 1 and 2 represent longitudinal sections of cylinders which embody my invention, but which differ slightly in construction. Fig. 3 is a detail sectional view of a portion of the cylinder on a much larger scale, and Fig. 4 represents a sectional view similar to Fig. 3 of a portion of a cylinder of modified construction, also embodying my invention.

Similar letters of reference designate corresponding parts in the several figures.

A designates the body of the cylinder. B designates heads or ends thereof, which are cast integral with the body, and C designates short shafts or gudgeons, which are driven or otherwise secured in hubs in the heads or ends, and which form the journals $a$ on which the cylinder rotates. The short shafts or gudgeons may be made slightly tapering and driven into the heads B, and when the journals become worn out the gudgeons may be removed and replaced by new ones.

The cylindric body A has its periphery ground or turned perfectly true to receive the toothed rings $b$ and interposed packing-rings, which cover the cylinder from end to end. In all cases these rings are secured in place and clamped together side by side by flanges which project slightly beyond the periphery of the cylindric body A at opposite ends thereof. In Fig. 1, one flange, $c$, is formed integral with the body by casting, and the other flange, $d$, fits in the rabbet $d'$ in the head.

In the cylinder shown in Fig. 2 there is at each end of the cylinder a flange, $d$, which fits in the rabbet $d'$ in the cylinder-head. The flanges $d$ are removably secured to the body and are formed with a rabbet, $d^2$, on their inner sides. The rabbet $d^2$ forms a continuation of the periphery of the cylinder and the seat for the rings $b$ at the end thereof. It will be understood that the flange $d$ cannot spring out away from the head of the cylinder without a slight increase in diameter or canting of the rabbetted portion $d^2$, (shown most clearly in Figs. 3 and 4,) which forms the ring-seat, and the rings $b$ fitted to such rabbeted portion snugly have a tendency to prevent such increase in diameter or canting of the rabbeted portion, and by so doing aid in preventing the springing of the flange *d* away from the cylinder.

The cylinders themselves are subjected to very little or no wear, and may be reclothed with new rings *b* and packing-rings as often as such rings become worn out.

To secure the rings *b* upon the cylindric body, one of the flanges *d* is removed, the rings are placed upon the body, the flange is replaced in its rabbet *d'*, and by means of a screw-press or otherwise the flange *d* is forced up tightly, clamping the toothed rings *b* and interposed packing-rings side by side. The flange *d* may then be secured by screws *e*, inserted through holes in the flange and screwed into the integral end of the cylinder, as represented in Fig. 4; but it will be obvious that if secured by such screws the follower or presser which exerts pressure upon the flange *d* must be provided with openings through which the screws *e* may be inserted, and that the presser must be made to bear upon the flange *d*, so that its openings will be opposite the screw-holes in the flange. To avoid the necessity of such careful adjustment of pressers, which would have to be provided of different sizes and with different series of openings, I prefer to secure the flange *d* to the head of the cylindric body by means of pins *f* inserted from the outer edge or circumference of the flange *d* through it and into the end B of the cylinder in a direction transverse to the axis thereof, as best shown in Fig. 3, but also in Figs. 1 and 2. The pins *f* may be driven into their holes *f'* when the flange *d* is pressed up against the bottom of its rabbet *d'*, and whenever it is desired to remove the flange *d* in order to take off the rings *b* these pins *f* may be driven directly through into the cylinder and fall within the latter.

What I claim as my invention, and desire to secure by Letters Patent, is—

1. The combination of a cylinder having in its end an annular rabbet, toothed rings and interposed packing-rings fitting said cylinder, and a removable flange secured near the circumference of the cylinder in said rabbet and rabbeted on its inner side so as to form an extension of the periphery of the cylinder and a seat for the end rings, substantially as and for the purpose herein described.

2. The combination of a hollow cylindric body, A, and integral heads or ends B, short shafts or gudgeons C, secured in the heads or ends, toothed rings *b* and interposed packing-rings made separate from and independent of each other and fitted on said body, a flange, *d*, fitted to the end of the body to secure the rings thereon, and securing devices *f*, inserted from the outer edge or circumference of the flange *d* in a direction transverse to the axis of the cylinder, entering the integral head or end and serving to secure the flange *d* in place, substantially as and for the purpose herein described.

CN. L. GODDARD.

Witnesses:
F. T. BLACKMER,
CHAS. R. JOHNSON.